(12) United States Patent
Randazzo et al.

(10) Patent No.: US 10,181,136 B2
(45) Date of Patent: Jan. 15, 2019

(54) SYSTEM AND METHOD FOR PROVIDING PEOPLE-BASED AUDIENCE PLANNING

(71) Applicant: Merkle, Inc., Columbia, MD (US)

(72) Inventors: Peter Randazzo, Port Washington, NY (US); John Gajewski, Dover, NH (US); John Lee, Wellesley, MA (US); Nicholas Illobre, New York, NY (US); Dionisio Espinal, New York, NY (US); Gerald Matthew Bavaro, Rockville Center, NY (US); David Michael Yonchak, New London, NH (US); Kelly Renee Leger, Denver, CO (US)

(73) Assignee: Merkle, Inc., Columbia, MD (US)

( * ) Notice: Subject to any disclaimer, the term of this patent is extended or adjusted under 35 U.S.C. 154(b) by 0 days.

(21) Appl. No.: 15/786,551

(22) Filed: Oct. 17, 2017

(65) Prior Publication Data

US 2018/0108046 A1 Apr. 19, 2018

Related U.S. Application Data

(60) Provisional application No. 62/409,374, filed on Oct. 17, 2016.

(51) Int. Cl.
*G06Q 30/00* (2012.01)
*G06Q 30/02* (2012.01)
*G06F 17/30* (2006.01)

(52) U.S. Cl.
CPC ... *G06Q 30/0269* (2013.01); *G06F 17/30368* (2013.01); *G06Q 30/0241* (2013.01);
(Continued)

(58) Field of Classification Search
CPC .......... G06Q 30/0241; G06Q 30/0243; G06Q 30/0251; G06Q 30/0255; G06Q 30/0271;
(Continued)

(56) References Cited

U.S. PATENT DOCUMENTS

| 6,947,898 B2 * | 9/2005 | Postrel | G06Q 20/06 705/14.27 |
| 7,428,498 B2 * | 9/2008 | Voltmer | B01J 23/6562 705/14.27 |

(Continued)

OTHER PUBLICATIONS

Buyya et al., "Cloudbus Toolkit for Market-Oriented Computing," CloudCom 2009, LNCS 5931, Springer-Verlag, Berlin, Germany, p. 24-44 (21 pages) (Year: 2009).*

*Primary Examiner* — Raquel Alvarez
(74) *Attorney, Agent, or Firm* — Finnegan, Henderson, Farabow, Garrett & Dunner LLP (57) ABSTRACT

Systems and methods for targeted advertising to specific consumers are disclosed. A system may include a memory storing instructions and at least one processor configured to execute the instruction to: receive, over a network, client-provided data from a client device; identify at least one consumer by comparing the client-provided data against consumer data recorded in an electronic consumer database; obtain at least one unique consumer identifier for the identified at least one consumer, the at least one unique consumer identifier not including personal identifiable information; generate a target audience pool based on the at least one unique consumer identifier; and deliver, over a network, the target audience pool to the client device to facilitate targeted advertising to specific consumers.

20 Claims, 4 Drawing Sheets

(52) U.S. Cl.
CPC ..... *G06Q 30/0243* (2013.01); *G06Q 30/0244* (2013.01); *G06Q 30/0246* (2013.01); *G06Q 30/0251* (2013.01); *G06Q 30/0255* (2013.01); *G06Q 30/0271* (2013.01); *G06Q 30/0277* (2013.01)

(58) Field of Classification Search
CPC .......... G06Q 30/0277; G06Q 30/0269; G06Q 30/0244; G06Q 30/0246; G06F 17/30368
USPC .......... 705/14.4, 14.42, 14.49, 14.53, 14.67, 705/14.73, 14.66, 14.43, 14.45
See application file for complete search history.

(56) References Cited

U.S. PATENT DOCUMENTS

| | | | |
|---|---|---|---|
| 7,921,036 B1 | 4/2011 | Sharma et al. | |
| 8,095,430 B2 | 1/2012 | Abhyanker | |
| 8,843,394 B2 | 9/2014 | Cao et al. | |
| 8,971,791 B2 | 3/2015 | Green et al. | |
| 9,449,334 B1 | 9/2016 | Abou-Rizk et al. | |
| 2002/0062249 A1* | 5/2002 | Iannacci | G06Q 20/10 705/14.1 |
| 2005/0021399 A1* | 1/2005 | Postrel | G06Q 20/06 705/14.28 |
| 2005/0165640 A1 | 7/2005 | Kotorov | |
| 2007/0112631 A1* | 5/2007 | Voltmer | B01J 23/6562 705/14.26 |
| 2010/0076841 A1 | 3/2010 | Rajpure et al. | |
| 2012/0035993 A1 | 2/2012 | Nangia | |
| 2014/0095288 A1* | 4/2014 | Redford | G06Q 20/387 705/14.27 |
| 2014/0188528 A1 | 7/2014 | Oxenham et al. | |
| 2015/0058120 A1 | 2/2015 | Guo et al. | |
| 2015/0310499 A1 | 10/2015 | Brook | |
| 2016/0080790 A1 | 3/2016 | Shkedi | |
| 2016/0189226 A1 | 6/2016 | Rao | |
| 2016/0283971 A1 | 9/2016 | Ernster et al. | |
| 2017/0148051 A1 | 5/2017 | Bagheri et al. | |

\* cited by examiner

SYSTEM AND METHOD FOR PROVIDING PEOPLE-BASED AUDIENCE PLANNING

RELATED APPLICATIONS

This application claims the priority of U.S. Provisional Patent Application No. 62/409,374, filed Oct. 17, 2016, which is hereby incorporated by reference in its entirety.

TECHNICAL FIELD

The present disclosure generally relates to computerized systems and methods for providing people-based audience planning and targeted advertising.

BACKGROUND

A vendor may target specific consumers, in a population of consumers, to address individualized marketplace needs. For example, a vendor may provide promotions customized for certain potential customers. Such promotional content (e.g. advertisements) may be uniquely tailored to different consumers. Personalizing promotional content for electronic delivery can lead to an increase in revenues, but there are some shortcomings. For example, marketing to address singular customer needs may be overly burdensome, time consuming, infeasible due to scalability, and expensive.

Consumer needs and wants may overlap with other needs and wants. Marketing based on dividing a prospective consumer audience into discrete categories representative of a particular defining characteristic can be beneficial. For example, clustering based on select behavioral data, demographic data, and product preferences may improve efficiency and reduce cost. Segmentation according to these conventional categories, however, may deprive a marketer of the benefits of marketing by category. For example, two consumers of the same age may receive the same advertisement because they are categorized in the same manner based on age. However, these consumers may be at different stages of their lives and thus have different motivations or values. This can lead to one consumer in the category enthusiastically purchasing the advertised product while the other consumer is vehemently opposed to purchasing the product. Segmenting these two consumers solely on a single basis (e.g., age) can be inefficient and ineffective.

Conventional segmentation techniques may also cause privacy and security concerns. For example, it is common for conventional systems to identify consumers using identifiers or information that includes personal identifiable information (e.g., name, email address, phone number or the like). It is also common for conventional systems to exchange these identifiers over communication networks. This can lead to data leaks or losses that can potential expose personal identifiable information of the consumers to attackers or other unauthorized users. Furthermore, attackers (e.g., hackers) can use the personal identifiable information obtained from one attack against the same or additional consumers in subsequent attacks (e.g., using techniques such as phishing, social engineering or the like).

Therefore, there is a need for an improved method of providing people-based audience planning and targeted advertising.

SUMMARY

One aspect of the present disclosure is directed to a system for targeted advertising to specific consumers. The system may include a memory storing instructions and at least one processor configured to execute the instruction to: receive, over a network, client-provided data from a client device; identify at least one consumer by comparing the client-provided data against consumer data recorded in an electronic consumer database; obtain at least one unique consumer identifier for the identified at least one consumer, the at least one unique consumer identifier not including personal identifiable information; generate a target audience pool based on the at least one unique consumer identifier; and deliver, over a network, the target audience pool to the client device to facilitate targeted advertising to specific consumers.

Another aspect of the present disclosure is directed to a computer-implemented method for targeted advertising to specific consumers. The computer-implemented method may include: receiving, over a network, client-provided data from a client device; identifying at least one consumer by comparing the client-provided data against consumer data recorded in an electronic consumer database; obtaining at least one unique consumer identifier for the identified at least one consumer, the at least one unique consumer identifier not including personal identifiable information; generating a target audience pool based on the at least one unique consumer identifier; and delivering, over a network, the target audience pool to the client device to facilitate targeted advertising to specific consumers.

Yet another aspect of the present disclosure is directed to a non-transitory computer-readable medium storing instructions executable by a processor to perform a method for targeted advertising to specific consumers. The method may include: receiving, over a network, client-provided data from a client device; identifying at least one consumer by comparing the client-provided data against consumer data recorded in an electronic consumer database; obtaining at least one unique consumer identifier for the identified at least one consumer, the at least one unique consumer identifier not including personal identifiable information; generating a target audience pool based on the at least one unique consumer identifier; and delivering, over a network, the target audience pool to the client device to facilitate targeted advertising to specific consumers.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing targeted advertising to specific consumers. For example, a client device (e.g., an advertiser or a publisher system) may provide consumer data to an advertisement agency over a network. Consumer data may include, for example, personal identifiable information (e.g., name, email address, phone number, street address, social security number or the like) and non-personal identifiable information (e.g., device identifiers, demographic data, segments, model scores or the like). The advertisement agency may process the consumer data and assign unique consumer identifiers to the consumers identified in the consumer data. In some embodiments, the unique consumer identifiers may not include any personal identifiable information. The advertisement agency may then generate a target audience pool for the client based on the unique consumer identifiers. Utilizing unique consumer identifiers, as in certain embodiments of the present disclosure, may help improve the efficiency of the target audience pool generation. Moreover, utilizing such unique consumer identifiers, as in certain embodiments of the present disclosure, may enhance data security, fidelity, and accuracy.

Figure 1:
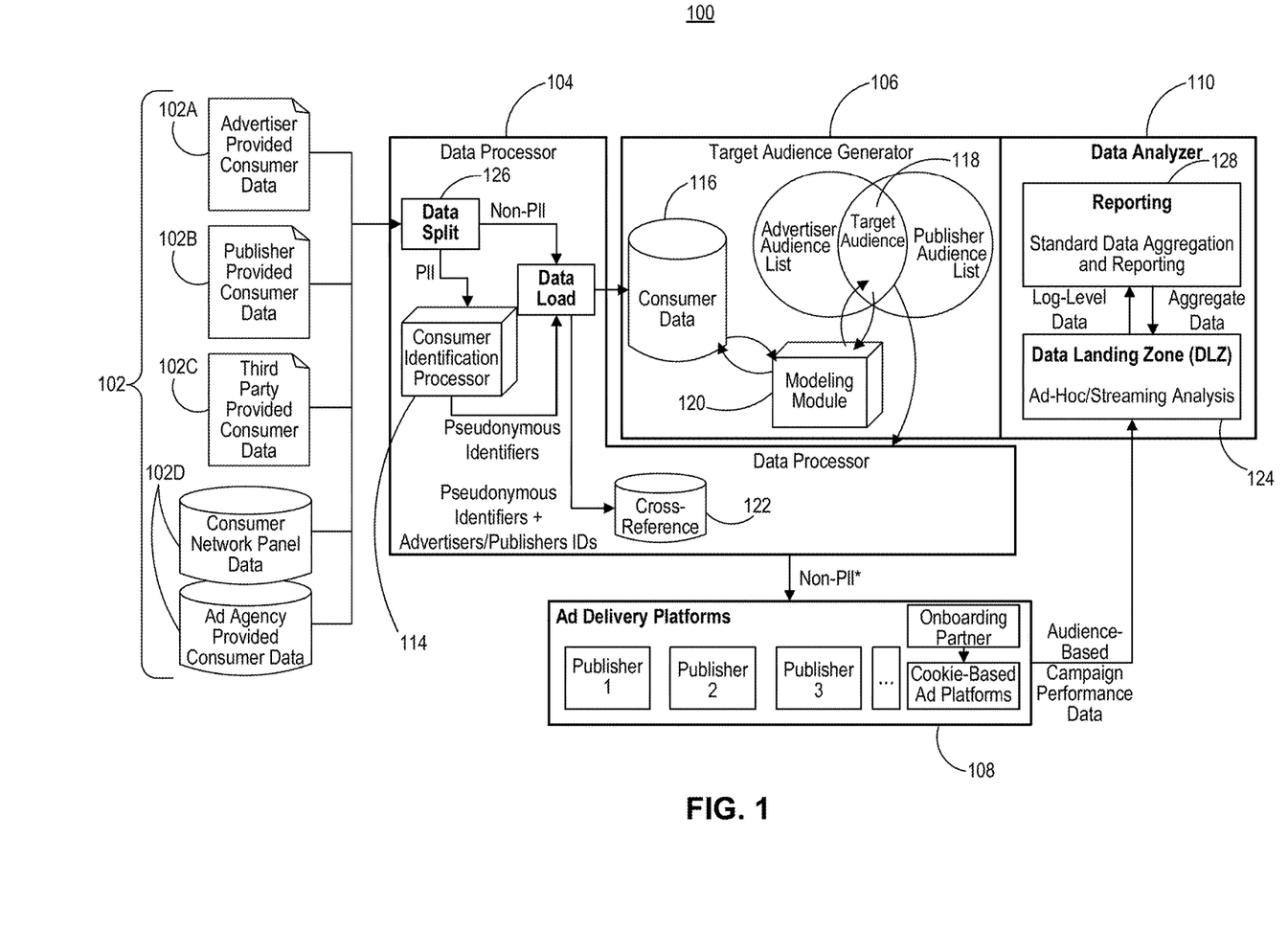
FIG. 1 is a schematic block diagram illustrating an exemplary embodiment of a system for targeted advertising to specific consumers, consistent with the disclosed embodiments.

Referring to FIG. 1, a schematic block diagram depicting an exemplary embodiment of a system for targeted advertising is shown. As illustrated in FIG. 1, a system 100 may include one or more data sources 102, a data processor 104, a target audience generator 106, an application interface 108, and a data analyzer 110.

The data sources 102 may include consumer data 102A provided by one or more advertisers, consumer data 102B provided by one or more publishers, consumer data 102C provided by one or more third-party data providers, or consumer data 102D provided by one or more advertisement agencies (e.g., agencies that provide targeted advertising services to adversities and publishers). In some embodiments, data in one or more of data sources 102 may be provided or stored as text files, binary files, database records, or various other types of computer-readable data formats.

In some embodiments, advertisers, publishers, third-party data providers, and advertisement agencies may utilize various types of computing devices to communicate with each other. Such computing devices may include, for example, servers, desktop computers, notebook computers, mobile devices, tablets, smartphones, wearable devices such as smart watches, smart bracelets, smart glasses, or any other devices that can communicate with a wired or wireless network.

In some embodiments, consumer data 102A provided by advertisers, consumer data 102B provided by publishers, consumer data 102C provided by third-party data providers, and consumer data 102D provided by advertisement agencies may be stored in physically or logically separated data storage devices to mitigate data mixing. For instance, consumer data 102A provided by an advertiser may be stored in a first data storage device that is physically or logically separated from a second data storage device used to store consumer data 102B provided by a publisher. Similarly, consumer data 102C provided by a third-party data provider may be stored in a third data storage device that is physically or logically separated from a fourth data storage device used to store consumer data 102D provided by an advertisement agency. In some embodiments, consumer data 102A provided by different advertisers may be stored in physically or logically separated data storage devices. Similarly, consumer data 102B provided by different publishers and consumer data 102C provided by different third-party data providers may be stored in physically or logically separated data storage devices. Such data storage devices may be implemented using any volatile or non-volatile memory including, for example, magnetic, semiconductor, tape, optical, removable, non-removable, or any other types of storage devices or computer-readable mediums.

The data processor 104 may serve as an entry point for the consumer data received from the various data sources 102A, 102B, 102C, or 102D. The data processor 104 may include one or more dedicated processing units, application-specific integrated circuits (ASICs), field-programmable gate arrays (FPGAs), or various other types of processors or processing units coupled with a non-transitory processor-readable memories configured for storing processor-executable code. When the processor-executable code is executed by the data processor 104, the data processor 104 may carry out instructions in response to various types of input signals received via the wired or wireless network.

In some embodiments, the data processor 104 may be configured to recognize personal identifiable information contained in the consumer data 102 (e.g., name, email address, phone number, street address, social security number or the like). The data processor 104 may be configured to recognize the personal identifiable information based on the labels associated with the data fields contained in the consumer data 102 (e.g., data fields contained in the consumer data 102 may be labeled "name," "email address," "phone number" or the like). Additionally or alternatively, the data processor 104 may be configured to recognize the personal identifiable information based the format of the data presented (e.g., a 10-digit numerical string may be recognized as a phone number and a text string having an "@" symbol may be recognized as an email address). It is to be understood that the data processor 104 may be configured to recognize the personal identifiable information contained in the consumer data 102 using various other techniques without departing from the scope and spirit of the present disclosure. The data processor 104 may then utilize a data split processor 126 (which may be implemented as a component of the data processor 104) to separate the personal identifiable information (PII) contained in the consumer data 102 from non-personal identifiable information (non-PII) contained in the consumer data 102 (e.g., device identifiers, demographic data, segments, model scores or the like).

In some embodiments, the PII contained in the consumer data 102 may be processed separately with respect to the non-PII contained in the consumer data 102. For instance, as illustrated in FIG. 1, the PII contained in the consumer data 102 may be processed by a consumer identification processor 114 (which may be implemented as a component of the data processor 104). The consumer identification processor 114 may be configured to recognize one or more consumers identified in the consumer data 102 based on name, email address, phone number, street address, social security number or the like. In some embodiments, if the advertisement agency has access to a consumer database 102D, the consumer identification processor 114 may be able to recognize the consumers by comparing the consumer data 102A provided by the advertiser (or the consumer data 102B provided by the publisher) against the consumer database 102D.

In some embodiments, the consumer identification processor 114 may implement various types of data formatting, filtering, validation, parsing, standardization, normalization, or correction techniques to process the consumer data 102. In these embodiments, the consumer identification processor 114 may also utilize various types of deterministic or probabilistic processing techniques to facilitate the consumer recognition process. Suitable deterministic or probabilistic processing techniques may include, but are not limited to, consideration of variations on name spelling (e.g., "Robert" as "Rob," "Bob," "Bobby," etc.), variations on address presentation (e.g., "Road" or "Rd," with or without apartment unit numbers, spelling variations on city, etc.), correction of common email address errors (e.g., misspelled or transposed letters in domain names or the like), and deducing telephone area code based on city and state.

Consumer identification processor 114 may assign a unique consumer identifier to one or more consumers that have been recognized in consumer data 102 (e.g., by consumer identification processor 114). In some embodiments, the unique consumer identifiers assigned by the consumer identification processor 114 may not include any personal identifiable information. In other words, the unique consumer identifiers assigned by the consumer identification processor 114 are pseudonymous identifiers.

In some embodiments, each pseudonymous identifier assigned by the consumer identification processor 114 may uniquely identify a particular consumer at a particular street address. For instance, distinct identifiers may be assigned to each particular address, and likewise, distinct identifiers may be assigned to each consumer name. Unique pairings of address and consumer identifiers may then be assigned and exchanged as surrogates for the underlying PII data records without exposing the PII data in subsequent components. Such pseudonymous identifiers can provide anonymity compared to PII-based identifiers because the pseudonymous identifiers, by definition, do not contain personal identifying information of the consumers. The pseudonymous identifiers can also provide improved security, fidelity, and accuracy compared to identifiers such as those based on web cookies, device identifiers, or Internet Protocol (IP) addresses (which typically have multiple consumers mapped to the same identifier, creating noise and reducing data fidelity). In some embodiments, the consumer identification processor 114 may retain a cross-reference 122 between the pseudonymous identifiers and the identifiers originally used by the client (e.g., the advertiser or the publisher). This cross-reference 122 may be stored in one or more non-transitory processor-readable memories accessible to the consumer identification processor 114 (and the data processor 104 in general).

The pseudonymous identifiers assigned by the consumer identification processor 114 may then be merged together with the non-PII contained in the consumer data 102 to produce pseudonymous consumer data 116. It is noted that the pseudonymous consumer data 116 may now contain pseudonymously identifiable information that can be utilized to generate a target audience pool for the client without revealing any personal identifiable information of the consumers.

In some embodiments, the target audience pool is generated using a target audience generator 106. The target audience generator 106 may include one or more dedicated processing units, application-specific integrated circuits (ASICs), field-programmable gate arrays (FPGAs), or various other types of processors or processing units coupled with a non-transitory processor-readable memories configured for storing processor-executable code. When the processor-executable code is executed by the target audience generator 106, the target audience generator 106 may carry out instructions to generate a target audience pool. In some embodiments, the target audience generator 106 is configured to process only the pseudonymous consumer data 116. Utilizing the pseudonymous consumer data 116 in this manner may help improve the efficiency of the target audience generator 106.

For example, suppose that an advertiser wants to run a targeted advertisement on a platform operated by a publisher. It may be in both parties' interest to utilize the target audience generator 106 to generate an audience pool for the targeted advertisement. To do so, the advertiser and the publisher may choose to provide their corresponding customer base (i.e., consumer data) 102A and 102B to the target audience generator 106. The advertiser-provided consumer data 102A and the publisher-provided consumer data 102B may be processed first by the data processor 104, which may purge personal identifying information from the data provided to produce the pseudonymous consumer data 116 as described above. The target audience generator 106 may then obtain a list of consumers 118 common to both advertiser-provided consumer data and publisher-provided consumer data. This list of consumers 118 can be obtained very efficiently by matching pseudonymous identifiers associated with the advertiser-provided consumer data against pseudonymous identifiers associated the publisher-provided consumer data after they have been processed by the data processor 104.

In some embodiments, the list of consumers 118 common to both advertiser-provided consumer data and publisher-provided consumer data may readily be identified as the target audience pool. Alternatively, the list of consumers 118 may be considered as a basis pool, which may then be expanded utilizing one or more lookalike audience models 120. For example, the target audience generator 106 may analyze the non-personal identifiable information (e.g., demographic data, segments, model scores or the like) associated with the consumers identified in the list of consumers 118 to obtain one or more top attributes describing such consumers. The top attribute(s) identified in this manner may then be utilized to help identify additional consumers provided by third-party data providers (e.g., data derived from consumer data 102C) or the advertisement agencies (e.g., data derived from consumer data 102D).

In another example, the advertiser may choose to ask the target audience generator 106 to process the advertiser-provided consumer data 102A without having to take into consideration any publisher-provided consumer data. The advertiser-provided consumer data 102A may be processed by the data processor 104, which may produce the pseudonymous consumer data 116 as described above. The target audience generator 106 may then analyze the pseudonymous consumer data 116 produced based on the advertiser-provided consumer data 102A to identify one or more top attributes describing the advertiser-provided consumer data 102A. The top attribute(s) identified in this manner may then be utilized to help identify additional consumers provided by third-party data providers (e.g., data derived from consumer data 102C) or the advertisement agencies (e.g., data derived from consumer data 102D).

It is to be understood that the target audience generation techniques described above are presented as examples and are not meant to be limiting. It is to be understood that specific implementations of target audience generation processes may vary from the examples presented above without departing from the scope and spirit of the present disclosure.

Figure 2:
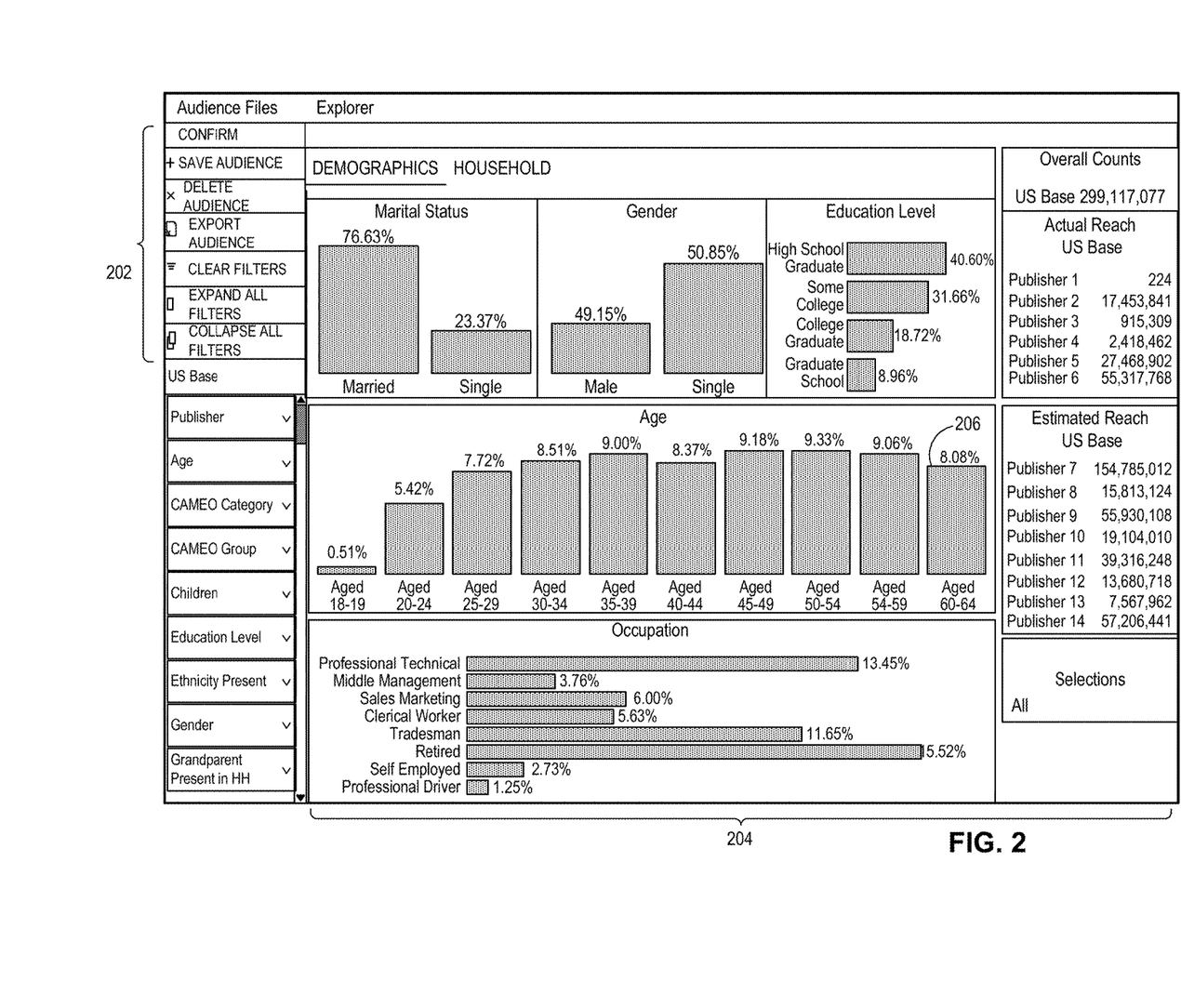
FIG. 2 is a diagrammatic illustration of an exemplary target audience review interface consistent with the disclosed embodiments

In some embodiments, once a target audience pool is generated, the target audience generator 106 may deliver the target audience pool (e.g., over a network) to the advertiser for review and approval. FIG. 2 is an illustration depicting an exemplary review interface. In this example, the target audience pool is generated based on consumer data recorded in an electronic consumer database 102D provided by an advertisement agency. The electronic consumer database 102D, in one embodiment, includes millions of records relating to consumers, each record having more than 1,000 attributes, including, but not limited to, email addresses, phone records, vehicle records, IP addresses, mortgage information, lifestyle/behavioral data, demographics data, transactional cooperative data, life events data (e.g., new movers, new homeowners, new parents, tri-bureau credit triggers and the like), wealth indicators, credit statistics, automotive data and automotive statistics, real property data, social media handles/flags, social influence, other syndicated research data and the like. Other embodiments of electronic consumer database 102D are possible as well.

It is contemplated that the advertiser may utilize the exemplary review interface shown in FIG. 2 to confirm or to modify the target audience pool. For example, the exemplary review interface may include a visual representation 204 of the target audience pool. The visual representation 204 may include one or more graphics indicating the composition of the target audience pool. For example, the visual representation 204 may indicate the composition in terms of education levels, gender, marital status or the like. The visual representation 204 may also indicate the composition in terms of age groups, occupations or the like. The visual representation 204 may further indicate the estimated reach (and if available, the actual reach based on historical/recorded data) of the advertisement if the advertiser approves the target audience pool presented.

The exemplary review interface may also include a control panel 202 configured to receive control input from the advertiser. For example, if the advertiser chooses not to target a specific age group 206, the advertiser may select the age group 206 (e.g., by clicking the age group 206 using a computer mouse) and click the "DELETE AUDIENCE" button in the control panel 202 to remove that specific age group 206 from the target audience pool. The modifications made by the advertiser may be communicated to the target audience generator 106 over the network, and the target audience generator 106 may adjust the target audience pool accordingly. On the other hand, if the advertiser is satisfied with the target audience pool, the advertiser may choose to confirm/approve the target audience pool by clicking the "CONFIRM" button in the control panel 202.

It is to be understood that the exemplary review interface shown in FIG. 2 is presented merely as an example and is not meant to be limiting. Once the advertiser confirms/approves the target audience pool, the application interface 108 may deliver the target audience pool to one or more publishers upon receipt of the advertiser's approval.

In some embodiments, because the target audience generator 106 is configured to process only the pseudonymous consumer data 116, the target audience pool generated by the target audience generator 106 may not contain certain identifiers required by the publishers. It is therefore noted that, in some embodiments, a publisher may require the target audience pool to be converted according to a publisher-specified conversion protocol so that the target audience pool delivered to the publisher may contain the identifiers required by the publishers.

In some embodiments, the data processor 104 may be configured to serve as a controlled exit point for converting/modifying the pseudonymous identifiers based on publisher specifications as needed. More specifically, in some embodiments, the data processor 104 may utilize the cross-reference dataset 122 populated earlier in the pseudonymous identifier generation process (described above) to help translate the pseudonymous identifiers contained in the target audience pool. For example, if the publisher uses web cookies or device identifiers to identify its target audience, the data processor 104 may convert the pseudonymous identifiers contained in the target audience pool to web cookies or device identifiers using reference data stored in the cross-reference dataset 122. Similarly, if the publisher uses hashed emails to identify its target audience, the data processor 104 may convert the pseudonymous identifiers contained in the target audience pool to hashed emails using reference data stored in the cross-reference dataset 122. The application interface 108 may then provide the target audience pool with converted identifiers to the publishers to carry out the advertisement campaign.

It is to be understood that the conversion described above is not always required. In certain embodiments, for example, the publisher may partner with the advertisement agency and may therefore have shared access to the pseudonymous identifiers. In such embodiments, the application interface 108 may provide the target audience pool to the publisher directly without conversion, and the publisher may identify the consumers in the target audience pool using the pseudonymous identifiers and carry out the targeted advertisement campaign.

In some embodiments, the performance data associated with the advertisement campaign may be collected and analyzed by the system 100. For instance, some publishers may provide log level details associated with their advertisement campaigns. The log level details may include information regarding the advertiser, the publisher, the advertisement campaign, the audience, the date, time, and location where the advertisements appeared, as well as the impression and click counts associated with the advertisement campaigns. The system 100 may utilize a data analyzer 110 to collect the log level details in a storage area 124 (commonly referred to as a staging area or a data landing zone). The data analyzer 110 may then use the log level details collected in the storage area 124 to facilitate data analysis.

For example, the data analyzer 110 may use the log level details collected in the storage area 124 to determine performance metrics, including, but not limited to, impressions, click-through rate, completion rates, percentage complete, engagement time, engagement rate and the like. The data analyzer 110 may then provide a report 128 containing the performance metrics to the advertiser or the publisher to evaluate the effectiveness of the advertisement campaign. In some embodiments, the data analyzer 110 may present the performance metrics to the advertisement agency, the advertiser, or the publisher through an interactive user interface (e.g., a web page or a mobile device application). Alternatively or additionally, the data analyzer 110 may present the performance metrics to the advertisement agency, the advertiser, or the publisher as periodical reports. In some embodiments, the presentation of the performance metrics (whether through an interactive user interface or through periodical reports) may include text or graphical representation as shown in FIG. 3.

Figure 3:
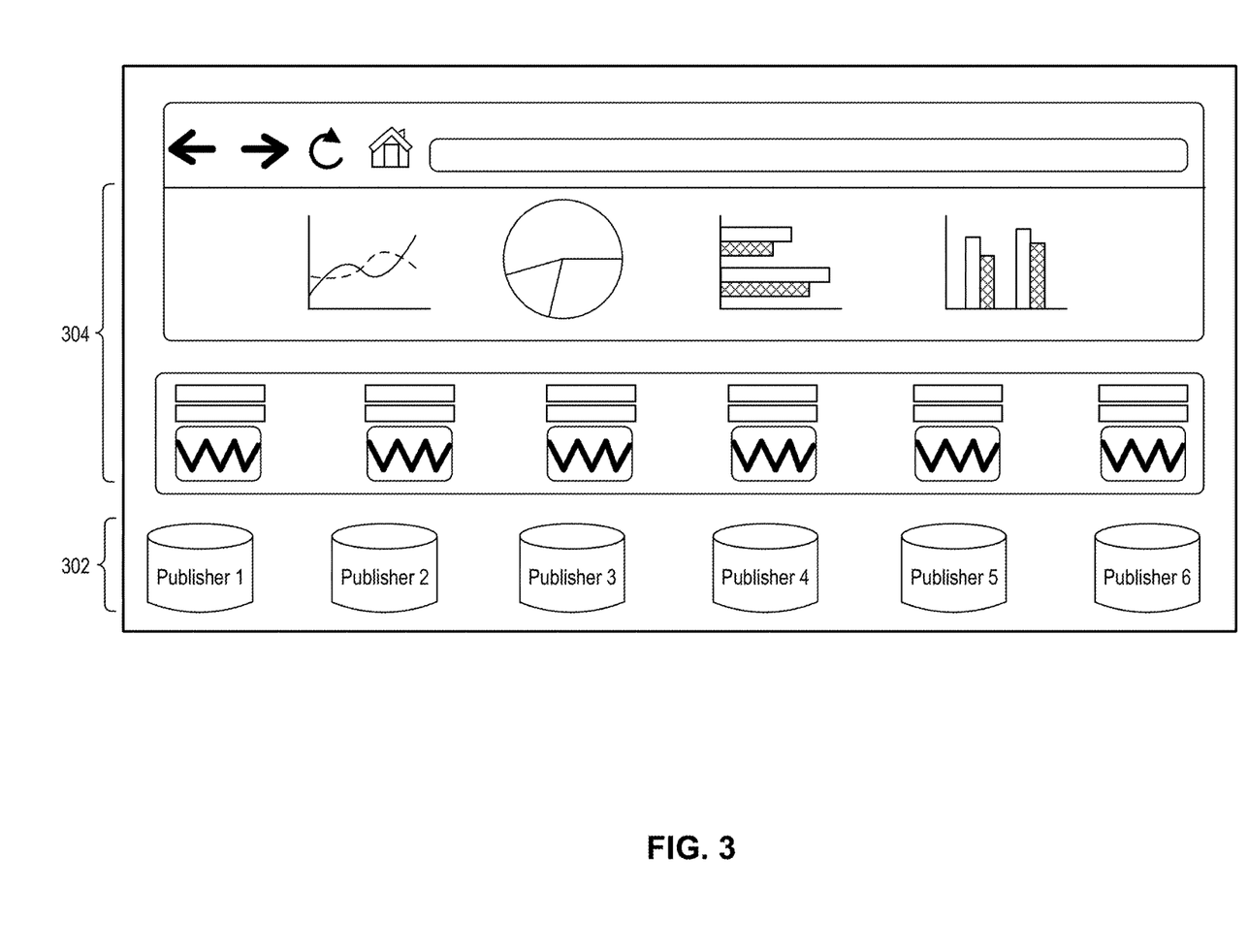
FIG. 3 is a diagrammatic illustration of an exemplary performance report consistent with the disclosed embodiments.

It is noted that FIG. 3 is merely a simplified example depicting an exemplary format for presenting performance metrics. For example, a panel 302 may provide the user a list of publishers involved in a particular advertisement campaign. In an interactive user interface, the user may select one of the publishers from the panel 302 and a display area 304 may display the performance metrics associated with the selected publisher. The display area 304 may display the performance metrics in various formats, including line charts, pie charts, bar charts, or text descriptions. In some embodiments, while the performance metrics may be aggregated, the aggregated performance metrics may be further analyzed against segments and demographic attributes made available in the pseudonymous consumer data 116 to provide additional insights.

Figure 4:
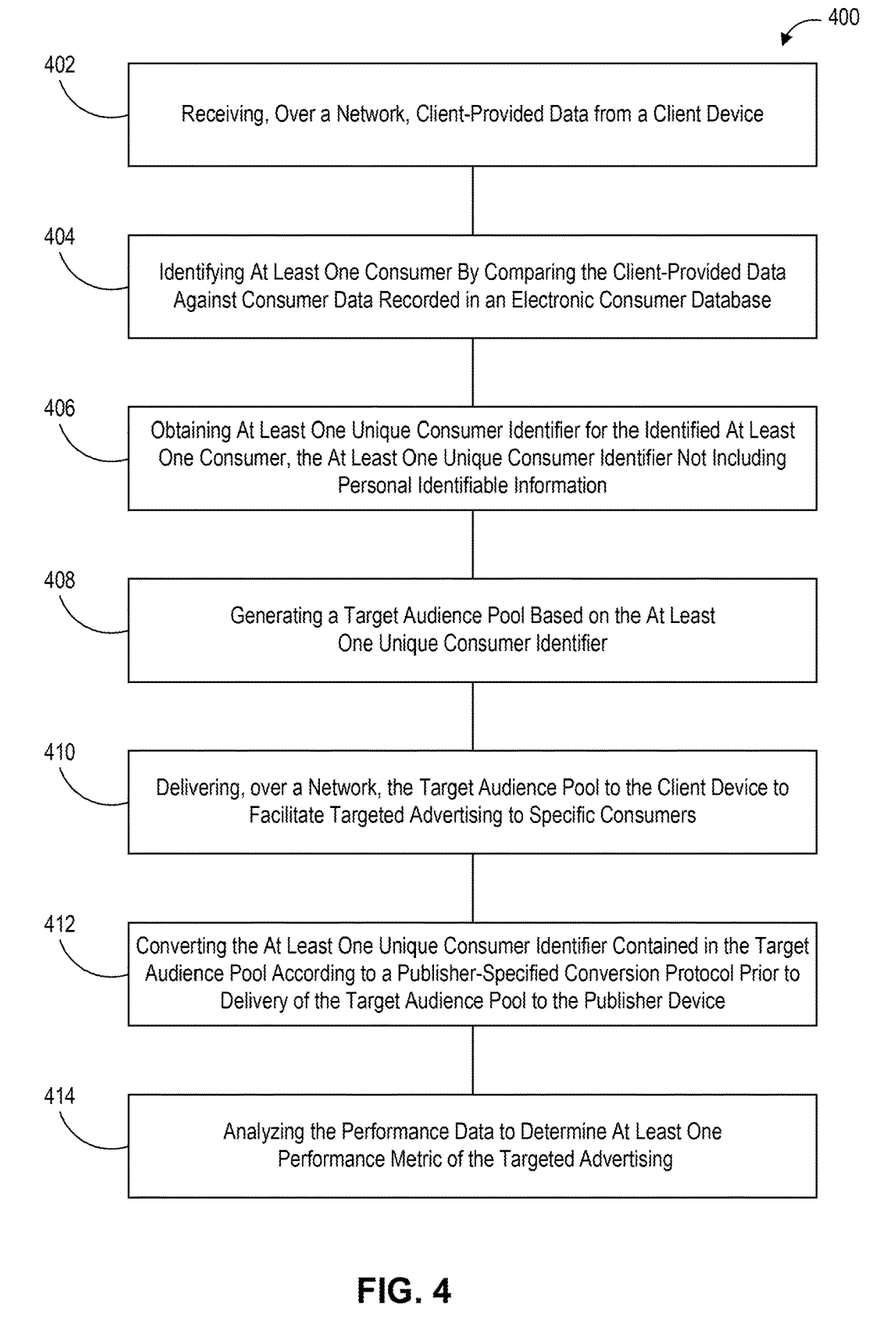
FIG. 4 is a flow chart illustrating an exemplary method for targeted advertising to specific consumers, consistent with the disclosed embodiments.

Referring now to FIG. 4, a flow diagram illustrating an exemplary method 400 for targeted advertising to specific consumers consistent with the disclosed embodiments is shown. While the exemplary method 400 is described herein as a series of steps, it is to be understood that the order of the steps may vary in other implementations. In particular, steps may be performed in any order, or in parallel. It is to be understood that each step of method 400 may be performed by one or more processors, computers, servers, controllers or the like.

In some embodiments, the method 400 may be performed by the system 100 (as depicted in FIG. 1). At step 402, the method 400 may include receiving, by the system 100, over a network, client-provided data from a client device. The client may be an advertiser or a publisher. The client may provide its customer base (i.e., its consumer data) to the system 100. The consumer data may include personal identifiable information (PII) as well as non-personal identifiable information (non-PII) about the consumers. The consumer data may also include client-assigned identifiers.

At step 404, the method 400 may include identifying one or more consumers identified in the client-provided data. The consumers may be identified by matching the client-provided data against consumer data recorded in an electronic consumer database. In some embodiments, the electronic consumer database may include millions of records relating to consumers, each record having more than 1,000 attributes, including, but not limited to, email addresses, phone records, vehicle records, IP addresses, mortgage information, lifestyle/behavioral data, demographics data, transactional cooperative data, life events data (e.g., new movers, new homeowners, new parents, tri-bureau credit triggers and the like), wealth indicators, credit statistics, automotive data and automotive statistics, real property data, social media handles/flags, social influence, other syndicated research data and the like. It is to be understood that the electronic consumer database may be expanded to include consumers based in other regions as well.

At step 406, the method 400 may assign unique consumer identifiers to the consumers identified in the client-provided data. In some embodiments, the unique consumer identifiers assigned to the consumers do not include personal identifiable information originally contained in the client-provided data. In other words, the unique consumer identifiers assigned in this manner are pseudonymous identifiers. In some embodiments, a cross-reference between the pseudonymous identifiers and the client-assigned identifiers originally provided by the client is retained. This cross-reference may be utilized later to help convert the pseudonymous identifiers to the client-assigned identifiers if such a conversion is required by the client.

At step 408, the method 400 may include generating a target audience pool. As described above with respect to FIG. 1, the system 100 may generate the target audience pool using consumer data provided by an advertiser alone, or in conjunction with consumer data provided by one or more publishers, third-party data providers, as well as advertisement agencies. It is noted that the basis of the target audience pool generation process is the pseudonymous identifiers. In other words, in some embodiments, the step 408 does not directly compare the consumer data provided by the advertiser against the consumer data provided by the publisher. Rather, in those embodiment, the step 408 may be configured to generate the target audience pool by matching pseudonymous identifiers associated with the advertiser-provided consumer data against pseudonymous identifiers associated the publisher-provided consumer data.

At step 410, the method 400 may include delivering, by the system 100, over a network, the target audience pool to the client device to facilitate targeted advertising to specific consumers. The step 410 may deliver the target audience pool to an advertiser for review and approval. The advertiser may request a change to the target audience pool if needed. Otherwise, the advertiser may approve the target audience pool, in which case the advertiser may proceed with a purchase of the targeted advertising.

In some embodiments, the method 400 may include a step 412 configured to convert the pseudonymous identifiers used to generate the target audience pool to identifiers recognized by a publisher. This conversion may be facilitated using the cross-reference previously mentioned. In some embodiments, the step 412 may convert the pseudonymous identifiers to web cookie-based identifiers, device identifiers, or hashed email-based identifiers. It is to be understood that the step 412 may convert the pseudonymous identifiers to other types of client-assigned identifiers without departing from the spirit and scope of the present disclosure.

In some embodiments, the method 400 may also include a step 414 configured to provide performance analysis of the targeted advertising. For instance, some publishers may provide log level details associated with their advertisement campaigns. The log level details may include information regarding the advertiser, the publisher, the advertisement campaign, the audience, the date, time, and location where the advertisements appeared, as well as the impression and click counts associated with the advertisement campaigns. The step 414 may collect the log level details and use the collected log level details to provide data analysis as previously described.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for targeted advertising to specific consumers, the system comprising:
    a memory storing instructions; and
    at least one processor configured to execute the instructions to:
        receive, over a network, advertiser-provided data from an advertiser device;
        store the advertiser-provided data;
        identify at least one advertiser-provided consumer by comparing the advertiser-provided data against consumer data recorded in an electronic consumer database;
        obtain at least one unique consumer identifier for the identified at least one advertiser-provided consumer, the at least one unique consumer identifier not including personal identifiable information;
        receive publisher-provided data from a publisher device;
        store the publisher-provided data in a data storage device, the publisher provided data being physically or logically separated from the advertiser-provided data to mitigate data mixing;
        identify at least one publisher-provided consumer by comparing the publisher-provided data against the consumer data recorded in the electronic consumer database;
        obtain at least one unique consumer identifier for the identified at least one publisher-provided consumer, the at least one unique consumer identifier not including personal identifiable information;
        identify at least one overlapping unique consumer identifier, the at least one overlapping unique consumer identifier comprising at least one unique consumer identifier belonging to both the at least one advertiser-provided consumer and the at least one publisher-provided consumer;
        generate a target audience pool based on the at least one overlapping unique consumer identifier; and
        deliver, over a network, the target audience pool to the advertiser device to facilitate targeted advertising to specific consumers.

2. The system of claim 1, wherein the advertiser-provided data is stored on a first data storage device and the publisher-provided data is stored on the second data storage device, and wherein the first and second data storage devices are portions of a computer-readable data storage device.

3. The system of claim 1, wherein the target audience pool is delivered to the advertiser device to facilitate a purchase of media advertising.

4. The system of claim 3, wherein the at least one processor is further configured to execute the instructions to:
    receive, over a network, a target audience pool modification request from the advertiser device; and
    modify the target audience pool based on the target audience pool modification request.

5. The system of claim 3, wherein the at least one processor is further configured to execute the instructions to:
    receive, over a network, an advertiser approval of the purchase of media advertising; and
    deliver, over a network, the target audience pool to the publisher device upon receipt of the advertiser approval.

6. The system of claim 5, wherein the at least one processor is further configured to execute the instructions to:
    convert the at least one unique consumer identifier contained in the target audience pool according to a publisher-specified conversion protocol prior to delivery of the target audience pool to the publisher device.

7. The system of claim 6, wherein the at least one processor is further configured to convert the at least one unique consumer identifier contained in the target audience pool to a web cookie-based identifier prior to delivery of the target audience pool to the publisher device.

8. The system of claim 6, wherein the at least one processor is further configured to convert the at least one unique consumer identifier contained in the target audience pool to a device identifier prior to delivery of the target audience pool to the publisher device.

9. The system of claim 6, wherein the at least one processor is further configured to convert the at least one unique consumer identifier contained in the target audience pool to a hashed email-based identifier prior to delivery of the target audience pool to the publisher device.

10. The system of claim 1, wherein the consumer data recorded in the electronic consumer database comprises advertiser-provided consumer data, publisher-provided consumer data, third-party-provided consumer data, or advertisement-agency-provided consumer data.

11. The system of claim 10, wherein each of the advertiser-provided consumer data, the publisher-provided consumer data, the third-party-provided consumer data, and the advertisement-agency-provided consumer data is stored in a logically separated data storage device to mitigate data mixing.

12. The system of claim 1, wherein each unique consumer identifier uniquely identifies a particular consumer at a particular street address.

13. The system of claim 1, wherein personal identifiable information comprises at least one of a name, an email address, a phone number, a street address, or a social security number.

14. The system of claim 1, wherein the target audience pool is delivered through a graphical user interface containing a visual representation indicating a composition of the target audience pool and an estimated reach of an advertisement using the target audience pool.

15. The system of claim 1, wherein the at least one processor is further configured to execute the instructions to:
collect performance data associated with the targeted advertising; and
analyze the performance data to determine at least one performance metric of the targeted advertising.

16. The system of claim 15, wherein the at least one processor is further configured to execute the instructions to:
provide a user interface containing a visual representation of the at least one performance metric of the targeted advertising.

17. The system of claim 1, wherein the publisher-provided data is received from the publisher device over a network.

18. The system of claim 1, wherein the at least one processor is further configured to execute the instructions to:
purge personal identifiable information from advertiser-provided data prior to identifying the at least one overlapping unique consumer identifier.

19. A computer-implemented method for targeted advertising to specific consumers, comprising a memory and a processor configured to execute instructions, the method comprising:
receiving, over a network, advertiser-provided data from an advertiser device;
storing the advertiser-provided data;
identifying at least one advertiser-provided consumer by comparing the advertiser-provided data against consumer data recorded in an electronic consumer database;
obtaining at least one unique consumer identifier for the identified at least one advertiser-provided consumer, the at least one unique consumer identifier not including personal identifiable information;
purging personal identifiable information from the advertiser-provided data;
receiving publisher-provided data from a publisher device;
storing the publisher-provided data in a data storage device, the publisher provided data being physically or logically separated from the advertiser-provided data to mitigate data mixing;
identifying at least one publisher-provided consumer by comparing the publisher-provided data against the consumer data recorded in the electronic consumer database;
obtaining at least one unique consumer identifier for the identified at least one publisher-provided consumer, the at least one unique consumer identifier not including personal identifiable information;
identifying at least one overlapping unique consumer identifier, the at least one overlapping unique consumer identifier comprising at least one unique consumer identifier belonging to both the at least one advertiser-provided consumer and the at least one publisher-provided consumer;
generating a target audience pool based on the at least one overlapping unique consumer identifier; and
delivering, over a network, the target audience pool to the advertiser device to facilitate targeted advertising to specific consumers.

20. A non-transitory computer-readable medium storing instructions executable by a processor to perform a method for targeted advertising to specific consumers, the method comprising:
receiving, over a network, advertiser-provided data from an advertiser device;
storing the advertiser-provided data;
identifying at least one advertiser-provided consumer by comparing advertiser-provided data against consumer data recorded in an electronic consumer database;
obtaining at least one unique consumer identifier for the identified at least one advertiser-provided consumer, the at least one unique consumer identifier not including personal identifiable information;
purging personal identifiable information from the advertiser-provided data;
receiving publisher-provided data from a publisher device;
storing the publisher-provided data in a data storage device, the publisher-provided data being physically or logically separated from the advertiser-provided data to mitigate data mixing;
identifying at least one publisher-provided consumer by comparing the publisher-provided data against the consumer data recorded in the electronic consumer database;
obtaining at least one unique consumer identifier for the identified at least one publisher-provided consumer, the at least one unique consumer identifier not including personal identifiable information;
identifying at least one overlapping unique consumer identifier, the at least one overlapping unique consumer identifier comprising at least one unique consumer identifier belonging to both the at least one advertiser-provided consumer and the at least one publisher-provided consumer;
generating a target audience pool based on the at least one overlapping unique consumer identifier; and
delivering, over a network, the target audience pool to the advertiser device to facilitate targeted advertising to specific consumers.

* * * * *